(12) United States Patent
Yin et al.

(10) Patent No.: US 11,436,376 B2
(45) Date of Patent: Sep. 6, 2022

(54) TERMINAL CHIP INTEGRATED WITH SECURITY ELEMENT

(71) Applicant: HUAWEI TECHNOLOGIES CO., LTD., Guangdong (CN)

(72) Inventors: Feifei Yin, Xi'an (CN); Yu Liu, Shanghai (CN); Jiayin Lu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/412,932

(22) Filed: May 15, 2019

(65) Prior Publication Data

US 2019/0266360 A1 Aug. 29, 2019

Related U.S. Application Data

(63) Continuation of application No. PCT/CN2017/111140, filed on Nov. 15, 2017.

(30) Foreign Application Priority Data

Nov. 15, 2016 (CN) .......................... 201611006033.2

(51) Int. Cl.
*G06F 21/75* (2013.01)
*G06F 21/60* (2013.01)
(Continued)

(52) U.S. Cl.
CPC ............ *G06F 21/755* (2017.08); *G06F 21/60* (2013.01); *G06F 21/71* (2013.01); *G06F 21/72* (2013.01);
(Continued)

(58) Field of Classification Search
CPC .......... G06F 21/31; G06F 21/60; G06F 21/71; G06F 21/72; G06F 21/76; G06F 21/78;
(Continued)

(56) References Cited

U.S. PATENT DOCUMENTS 6,054,893 A * 4/2000 Singh ..................... G11C 17/16
327/525
8,912,814 B2 12/2014 Yannette et al.
(Continued)

FOREIGN PATENT DOCUMENTS

CN 1481526 A 3/2004
CN 101588643 B 11/2009
(Continued)

OTHER PUBLICATIONS

Gomina et al., "Power supply glitch attacks: design and evaluation of detection circuits," 2014 IEEE Int'l Symposium on Hardware-Oriented Security and Trust (HOST), pp. 136-141 (Year: 2014).*
(Continued)

*Primary Examiner* — Michael S McNally
(74) *Attorney, Agent, or Firm* — Fish & Richardson P.C.

(57) ABSTRACT

The present application provides example terminal chips. One example terminal chip includes a security element, an application processor, and an interface module configured to transfer information between the application processor and the security element. The terminal chip includes a first power interface configured to receive power outside the terminal chip. A first power input port of the security element is connected to the first power interface, and at least one of the application processor or the interface module is connected to the first power interface. In the example terminal chip, a power supply port of the security element is connected to a power supply port of the application processor or the interface module of the terminal chip.

10 Claims, 2 Drawing Sheets

(51) Int. Cl.
  *G06F 21/72* (2013.01)
  *G06F 21/71* (2013.01)
  *G06F 21/81* (2013.01)
(52) U.S. Cl.
  CPC .............. *G06F 21/75* (2013.01); *G06F 21/81* (2013.01); *G06F 2221/2107* (2013.01)
(58) Field of Classification Search
  CPC ........ G06F 21/755; G06F 21/75; G06F 21/81; G06F 2221/2107; H04L 9/32; H04W 12/06
  USPC .......................................................... 726/26
  See application file for complete search history.

(56) References Cited

U.S. PATENT DOCUMENTS

| | | | | |
|---|---|---|---|---|
| 2002/0167394 | A1* | 11/2002 | Couillard | G06K 19/0716 340/5.53 |
| 2004/0039928 | A1 | 2/2004 | Elbe et al. | |
| 2012/0104854 | A1* | 5/2012 | Tasaki | H02M 3/07 307/43 |
| 2013/0187456 | A1* | 7/2013 | Bilhan | H02J 4/00 307/28 |
| 2014/0380403 | A1* | 12/2014 | Pearson | G06F 21/60 726/1 |
| 2015/0149843 | A1* | 5/2015 | Finan | G01R 31/31705 714/726 |
| 2016/0378344 | A1* | 12/2016 | Nachimuthu | G06F 9/4403 711/103 |

FOREIGN PATENT DOCUMENTS

| | | |
|---|---|---|
| CN | 103034804 A | 4/2013 |
| CN | 103730161 A | 4/2014 |
| CN | 104657306 A | 5/2015 |
| CN | 204360420 U | 5/2015 |
| CN | 104781825 A | 7/2015 |
| CN | 205158415 U | 4/2016 |
| CN | 106096457 A | 11/2016 |
| EP | 1022683 A2 | 7/2000 |
| JP | 2001318730 A | 11/2001 |
| JP | 2004516706 A | 6/2004 |
| JP | 2008512909 A | 4/2008 |
| KR | 100568393 B1 | 4/2006 |
| WO | 0248857 A2 | 6/2002 |

OTHER PUBLICATIONS

PCT International Search Report and Written Opinion issued in International Application No. PCT/CN2017/111140 dated Feb. 14, 2018, 14 pages (with English translation).

Extended European Search Report issued in European Application No. 17872149.4 dated Oct. 11, 2019, 7 pages.

Office Action issued in Chinese Application No. 201611006033.2 dated Jul. 30, 2020, 14 pages (with English translation).

Office Action issued in Korean Application No. 2019-7016888 dated Jul. 13, 2020, 9 pages (with English translation).

Office Action issued in Japanese Application No. 2019-546965 dated Aug. 11, 2020, 6 pages (with English translation).

* cited by examiner

TERMINAL CHIP INTEGRATED WITH SECURITY ELEMENT

CROSS-REFERENCE TO RELATED APPLICATIONS

This application is a continuation of International Application No. PCT/CN2017/111140, filed on Nov. 15, 2017, which claims priority to Chinese Patent Application No. 201611006033.2, filed on Nov. 15, 2016, The disclosures of the aforementioned applications are hereby incorporated by reference in their entireties.

TECHNICAL FIELD

The present invention relates to the chip field, and in particular, to terminal integrated with a security element.

BACKGROUND

With performance improvement of intelligent terminals and popularity of Internet applications, people usually use a wireless network of an intelligent terminal to perform online payment or another financial activity in daily life. To reduce accompanying financial security risks, the intelligent terminal is usually provided with a security element. A coprocessor, a security application for encryption, decryption, and authentication, and a corresponding protocol platform are usually embedded into the security element. The security element provides identity authentication and information encryption services for a user of the intelligent terminal in a financial transaction process.

A SIM card is a relatively common security element distributed by an operator and may be used for identity authentication. In addition, a USB key management client may be stored in the SIM card to meet a network bank function requirement of each bank. The SIM card is generally connected to a system in an intelligent terminal by using a dedicated slot on the intelligent terminal.

With advancement in production processes, in recent years, a security element is fastened in an independent chip form together with another component such as a processor chip of an intelligent terminal, to a backplane of the intelligent terminal, and is referred to as an embedded security element (eSE for short) chip in the industry. A function of the embedded security element chip is basically the same as that of the SIM card. However, the embedded security element chip is customized by a terminal device manufacturer; therefore, an interface and a communications module of the embedded security element chip can be flexibly disposed, so as to interwork and share data with another chip and component in the intelligent terminal.

Both the embedded security element chip and the processor chip are powered by a power management chip in the intelligent terminal. Currently, there is an attack manner referred to as power supply pin burr injection. An attacker performs voltage burr injection by using a power supply pin of the embedded security element chip. The voltage burr injection causes a temporary fluctuation on a voltage signal on the power supply pin. This temporary fluctuation causes a drift on threshold voltage of a transistor in the chip; therefore, sampling input time of some triggers are abnormal. Consequently, the triggers enter an error state and a misoperation is caused. The attacker may establish, based on the misoperation caused, a model for analysis, so as to discover important security information hidden in the embedded security element chip and violate user benefits.

Therefore, it is necessary to provide a solution to prevent security information leakage when a security element encounters a power supply attack.

SUMMARY

Embodiments of the present invention provide a terminal chip. The terminal chip includes a security element, an application processor, and an interface module configured to transfer information between the application processor and the security element. The terminal chip includes a first power interface configured to receive power outside the terminal chip. A first power input port of the security element is connected to the first power interface, and a power supply port of at least one of the application processor or the interface module is connected to the first power interface.

In the terminal chip in the embodiments of the present invention, the power supply port of the security element is connected to the power supply port of the application processor or the interface module of the terminal chip. Therefore, when a power supply attack occurs, power supply causes abnormality of the application processor or the interface module of the terminal chip at the same time. Because of the abnormity of the application processor and the interface module, information in the security element cannot be correctly obtained from external. Consequently, an attacker cannot obtain sensitive information from the security element by performing the power supply attack.

The terminal chip includes a plurality of interface modules, such as a bus and a memory controller. At least one of the application processor, the memory, or the memory controller is connected to the first power interface.

The first power interface is a digital power interface.

The terminal chip further includes a second power interface, and the second power interface is an analog power supply. The security element further includes an analog power supply port, and the analog power supply port is connected to the analog power interface.

The terminal chip further includes a high-speed interface physical layer circuit, a phase-locked loop circuit, and an electrically programmable fuse circuit, and at least one of the high-speed interface physical layer circuit, the phase-locked loop circuit, or the electrically programmable fuse circuit is connected to the analog power interface. The analog power supply port is connected to the analog power interface. Therefore, when the power supply attack is initiated from the analog power interface, damages of the high-speed interface physical layer circuit, the phase-locked loop circuit, or the electrically programmable fuse circuit can affect normal operation of the application processor, so that it is more difficult for the attacker to obtain the sensitive information from the security element.

To further improve security, a minimum timing margin in the security element is greater than a minimum timing margin of the application processor or the interface module connected to the first power interface, thereby ensuring that the application processor or the interface module firstly becomes abnormal under the power supply attack.

A system for security authentication is provided in the security element.

The security element includes a coprocessor, a security bus, and a module configured to perform encryption, decryption, and identity authentication.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
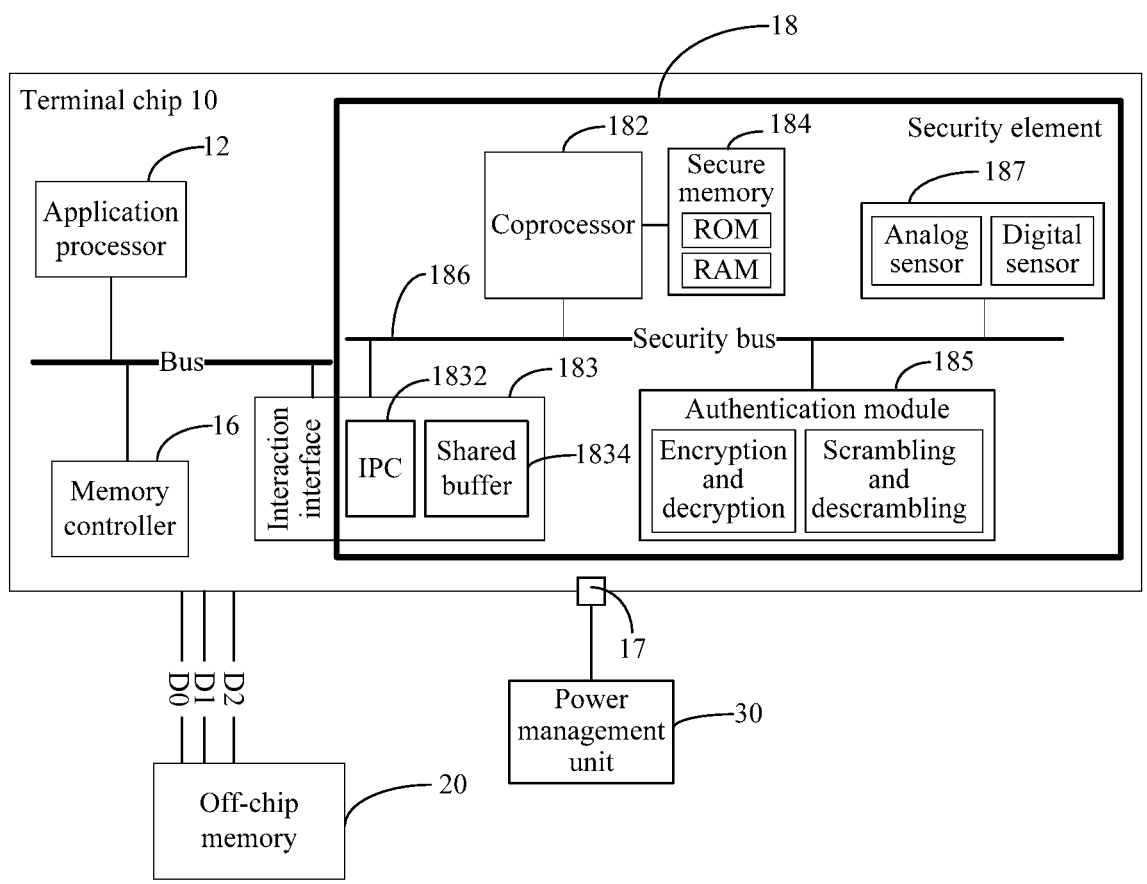
FIG. 1 is a schematic diagram of a terminal device according to an embodiment of the present invention.

FIG. 1 is a schematic diagram of an architecture of a terminal device in an embodiment of the present invention. As shown in the figure, the terminal device includes a terminal chip 10, an off-chip memory 20, and a power management unit 30 (Power Management unit, PMU for short). The terminal chip 10 includes an application processor 12, a bus 14, a memory controller 16, and a security element 18.

The application processor 12 is usually a so-called central processing unit (Central Processing Unit, CPU for short), and is configured to perform tasks according to instructions from various application programs. The application processor 12 interacts with another module in the main chip 10 by using the bus 14. In an optional embodiment, when an application program that has a security requirement needs to access the security element, the application processor 12 writes access request into the off-chip memory 20 by using the memory controller 16, and instructs the security element 18 to extract, by using the memory controller 16, the access request from the off-chip memory 20. When the security element 18 needs to send data back to the application processor 12, the security element 18 also writes the to-be-sent-back data into the off-chip memory 20 by using the memory controller 16, and instructs the application processor 12 to extract the sent back data from the off-chip memory 20.

The security element 18 has a function similar to that of the security element described in the Background section, and is configured to provide security services, such as authentication, encryption, and decryption, for a task that has a security requirement in a security system. In this embodiment of the present invention, modules of the security element 18 are integrated into the terminal chip and exchange data with the application processor 12 and the off-chip memory 20 through a unique interface. As shown in FIG. 1, the security element 18 in this embodiment of the present invention includes a coprocessor 182, an interaction interface 183, a secure memory 184, an authentication module 185, a security bus 186, and a sensor module 187.

The coprocessor 182 is configured to coordinate and schedule various tasks in the security system.

The interaction interface 183 includes an IPC (Inter-Process Communication, inter-process communication) module 1832 and a shared buffer 1834. The IPC module is configured to send an interruption request to the application processor 12 or the coprocessor 182, and the shared buffer 1834 is configured to buffer to-be-executed request data for the application processor 12 and the coprocessor 182. The shared buffer 1834 is the unique data interface in the main chip 10 which leads to the security element 18. When the terminal chip 10 has request data that needs to be processed by the security element 18, the request data is usually first stored in the off-chip memory 20; then, the application processor 12 writes the request data into the shared buffer 1834 by using the bus, and sends an interruption request to the coprocessor 182 by using the bus 14 and the IPC module 1832. After receiving the interruption request, the coprocessor 182 extracts the request data from the shared buffer, and performs a corresponding task. After executing the request data, the coprocessor 182 may write a processing result into the shared buffer 1834, and then instructs the IPC module to send, by using the bus 14, an interruption request, to instruct the application processor 12 to extract the processing result.

The interruption request, as the name implies, makes a receiving side interrupt a currently on-going operation or application. A requirement of a security related application, such as an online payment or a financial transaction, usually has a high priority. Therefore, sending the interruption request can ensure that the coprocessor in the security element 18 can extract, in priority, the request data from the buffer 1834 and executes the request data.

As a dedicated memory of the coprocessor 182, the secure memory 184 is configured to store system or platform code. Generally, the secure memory 184 includes two types of memories: ROM (Read-Only Memory, read-only memory) and RAM (Random Access Memory, random access memory). The ROM is configured to store code for startup, self-check, and initialization of the security system; and the RAM is configured to store security-related security application code and data in an operating system software.

The authentication module 185 is configured to perform, according to the request data received from the shared buffer 1834, an operation related to identity authentication, such as random number generation, key management, encryption, and decryption.

The security bus 186 is configured to provide a bus service for the modules in the security element 18.

The sensor module 187 includes a digital sensor and an analog sensor, and is configured to detect illegal physical intrusion into the security element 18 and send an alarm to the coprocessor 182. The coprocessor 182 resets the system, clears a register, or performs another operation to protect sensitive information in the security element.

Certainly, in addition to the foregoing modules, there are many other function modules in the terminal chip and the security element, and details are not described herein.

In this embodiment of the present invention, the terminal chip 10 further includes a power interface 17. In an optional implementation, the power interface 17 may be a pin of the terminal chip 10. The power interface 17 is connected to the power management unit 30, and is configured to receive power from the power management unit 30 and supply power to a plurality of modules in the terminal chip 10.

A power supply port of the security element 18 is connected to the power interface 17, and is configured to receive power through the power interface 17, so as to satisfy power requirements of the modules in the security element 18. In addition, a voltage input end of at least one of the application processor 12, the bus 14, or the memory controller 16 is connected to the power interface 17, and is configured to receive power through the power interface 17, to satisfy a power requirement. In this way, when an attacker launches a power supply attack through the power interface 17, the application processor 12, the bus 14, or the memory controller 16 becomes abnormal, so that the attacker cannot obtain correct feedback information from the security element 18, thereby preventing information leakage.

To better prevent the security element 18 from leaking information under the power supply attack, in this embodiment of the present invention, a minimum timing margin of register arrays in the security element 18 is set to be greater than a minimum timing margin of the application processor 12, the bus 14, or the memory controller 16 that is connected to the power interface 17. In this way, when the power supply attack occurs, a register array in the application processor 12, the bus 14, or the memory controller 16 becomes abnormal.

For ease of understanding the technical content of this embodiment of the present invention, a concept of the timing margin is described herein.

A field-programmable gate array (Field-Programmable Gate Array, FPGA for short) or another integrated circuit is a very common integrated circuit combination mode currently, and may be configured to transfer an instruction and data. The FPGA is widely applied to function modules including a processor, a bus, and a memory controller that are in a terminal chip. The security element in this embodiment of the present invention also includes integrated circuits corresponding to the coprocessor, the security bus, and memory control, and certainly includes various FPGAs.

Figure 2:
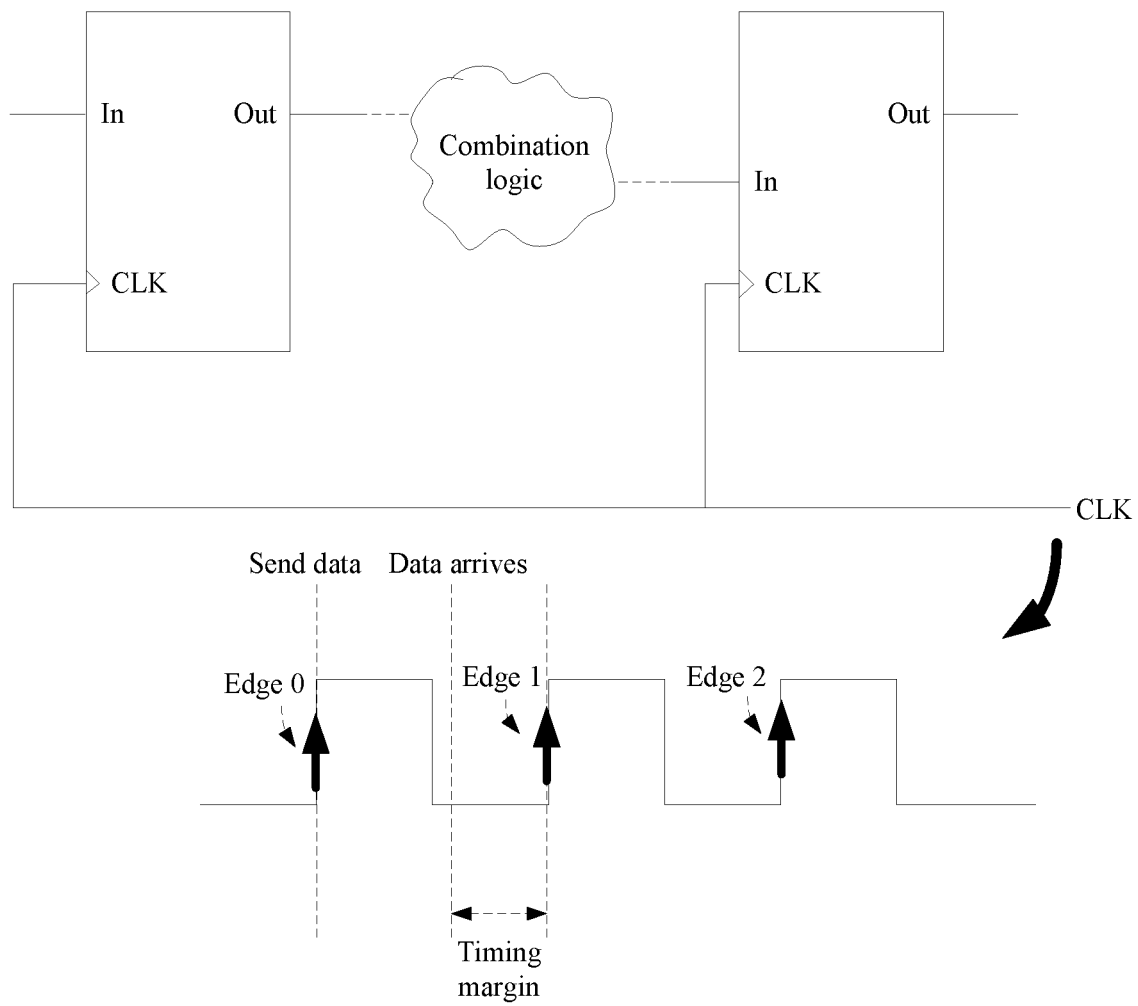
FIG. 2 is an indication diagram of a "timing margin" in a related integrated circuit.

A register is a basic unit in an FPGA. In a running process of the FPGA, a digital signal is transferred between registers. As shown in FIG. 2, a register D1 transfers a signal 0 or 1 to a register D2. Both the register D1 and D2 operate under control of a same clock signal. The clock signal shown in FIG. 2 includes three rising edges: an Edge 0, an Edge 1, and an Edge 2. The register D1 starts to send the signal at the rising edge Edge 0. A delay exists in a process of latching data by a register; therefore, to ensure that the register D2 can correctly latch the signal, the signal needs to arrive at the register D2 ahead of a period of time before arrival of the rising edge Edge 1. The "a period of time ahead" may be regarded as "a timing margin". If a size of the timing margin allows that the register D2 latches the signal before the arrival of the rising edge Edge 1, the register D2 can correctly latch the signal sent by the register D1. If the size of the timing margin does not satisfy a time for the register D2 to latch the signal, that is, if the rising edge Edge 1 arrives before the register D2 successfully latches the signal sent by the register D1, an error may occur when the signal is finally latched by the register D2.

It can be easily learned from the foregoing description that, for two adjacent registers that have been preset and combinational logic between the two adjacent registers, a timing margin that satisfies normal operation has a minimum value, that is, in the normal operation, the two adjacent registers can correctly transfer a signal to each other on the prerequisite that a minimum timing margin is satisfied. In a normal case, it is always ensured that a timing margin can satisfy a requirement in design of an integrated circuit. However, when the two adjacent registers encounter a power supply attack, an extra delay is generated during signal transfer between the two adjacent registers, and consequently, the timing margin becomes insufficient. Therefore, a larger timing margin indicates that the register array has a higher resistance to the power supply attack.

In this embodiment of the present invention, a stricter standard is used on a timing margin of each register array in the security element 18 in a design phase while the minimum timing margin required for normal operation is satisfied, so as to ensure that a minimum timing margin in the security element 18 is greater than a minimum timing margin of the bus, the memory controller, or the application processor that is also connected to the power interface 17. In this way, when the power supply attack occurs, a register array of the bus, the memory controller, or the application processor becomes abnormal. Consequently, an external information path of the security element 18 becomes incorrect under the power supply attack, and the attacker cannot obtain the sensitive information in the security element 18 by using abnormality feedback to the power supply attack.

Certainly, in an optional embodiment, if an operating status of another interface module, in addition to the application processor 12, the bus 14, and the memory controller 16, in the terminal chip, can directly affect writing data into or reading data from the security element 18, connecting a power input port of the interface module and a power input port of the security element to a same power supply pin can also implement technical effects of the present invention.

Function modules such as the application processor, the bus, the memory controller, and the security element 18 usually include a plurality of register arrays.

In FIG. 2, data sent by the register D1 to the register D2 is delayed twice before arriving at the register D2. The register D1 starts to trigger sending of the data at the time point Edge 0, and allows the data to actually depart from the register D1 after a very short time period t1. The time period t1 is a broadcast delay of the register D1. In this embodiment of the present invention, the time period t1 is referred to as a sending delay. Time is consumed for sending a signal through the register D1 and on a path from the register D1 to the register D2. Various logic devices are further disposed between the register D1 and the register D2, and time is also consumed for the signal to pass through these logic devices. In this embodiment of the present invention, a time period t2 is obtained by adding the time consumed for sending the signal on the path between the registers D1 and D2 and the time consumed for the signal to pass through the logic devices between the registers D1 and D2, and the t2 is used as a path delay. Therefore, after being sent by the register D1 at the Edge 0, the signal can arrive at the register D2 after a time period t1+t2. A time interval between the Edge 0 and the Edge 1 is fixed; therefore, a timing margin may be increased by shortening the time period t1+t2. To shorten the time period t1+t2, a more sensitive register may be chosen and used to shorten the sending delay t1, or a quantity of the logic devices between the registers may be reduced to shorten the path delay t2.

In an actual product, the terminal chip includes two types of power interfaces: digital power interface and analog power interface. The digital power interface is usually connected to digital voltage of 0.8 v (in new 16 nm and 28 nm processes, the digital voltage is 0.8 v, while in another old process, the digital power supply voltage may be greater than 0.8 v), and is configured to supply power to a digital function device in the terminal chip, such as the application processor, the bus, or the memory controller. Therefore, the power interface described above is actually a digital power interface. For the security element, all important devices in the security element, such as the coprocessor, the authentication module, and the security bus, need digital power supply input. Therefore, this is very important to prevent a power supply attack that launches from a digital power supply side.

The analog power interface is usually connected to analog voltage of 1.8 v (in the new 16 nm and 28 nm processes, the analog voltage is 1.8 v, while in another old process, the data power supply voltage may be greater than 1.8 v), and is usually configured to supply power to analog devices of a chip memory in the terminal chip, such as a high-speed interface physical layer circuit (DDR-phy), a phase-locked loop circuit (Phase Locked Loop, PLL for short), and an eFuse circuit (electrically programmable fuse). In the security element 18, a monitor circuit, a sensing circuit, and the like usually need analog power input, and these circuits do not process or store sensitive information. Therefore, a power supply attack launched by an attacker from an analog power supply does not cause a very serious leakage risk.

The security element is used as an integrated module embedded in the terminal chip, and an area of the security element occupies a small proportion in the terminal chip. Therefore, the security element, as a whole, usually includes only two power input ports: an analog power input and a digital power input. The digital power input and the analog power input are connected to the digital power interface and the analog power interface of the terminal chip respectively. A wiring requirement of the terminal chip needs to be considered, and there may be a plurality of digital power input ports or a plurality of analog power supply ports. Anyhow, according to the description in the foregoing embodiments, connecting a digital power input of the bus, the memory controller, or the application processor of the terminal chip to a same digital power interface as the digital power input of the security element can prevent information in the security element from being leaked. In addition, a minimum timing margin of a module that is in the security element and that is connected to the digital power interface is greater than the minimum timing margin of the bus, the memory controller, or the application processor of the terminal chip. Therefore, a better security effect can be achieved.

In addition, if a function module that receives analog power input and that is in the terminal chip, such as the high-speed interface physical layer circuit, the phase-locked loop circuit, or the eFuse circuit in the chip memory, becomes abnormal under the power supply attack, the attacker is also interfered with when stealing the sensitive information from the security element by using the function module of the terminal chip. Therefore, in a special scenario, some function modules in the terminal chip that receive the analog power input may alternatively be connected to a same analog power interface as the security element, and a minimum timing margin of a corresponding module of the security element is set to be greater than a minimum timing margin of another module connected to the analog power interface.

In the embodiment provided in this application, it should be understood that the disclosed system may be implemented in other manners. For example, the described apparatus embodiment is merely an example. For example, the module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The modules described as separate parts may or may not be physically separate, and parts displayed as modules may or may not be physical units, may be located in one position, or may be distributed on a plurality of network nodes. Some or all the nodes may be selected according to actual needs to achieve the objectives of the solutions of the embodiments.

In addition, function modules in the embodiments of the present invention may be integrated into one processing unit, or each of the modules may exist alone physically, or two or more modules are integrated into one module. The foregoing integrated unit may be implemented in a form of hardware, or may be implemented in a form of a software function unit.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A chip, the chip comprising:
   a security element comprising a register array;
   an application processor;
   a plurality of pins; and
   an interface module configured to transfer information between the application processor and the security element,
   wherein the security element provides identity authentication or information encryption, the security element and at least one of the application processor or the interface module are powered by one common pin among the plurality of pins, and
   wherein a minimum timing margin in the security element is greater than a minimum timing margin of the application processor powered by the common pin or a minimum timing margin of the interface module powered by the common pin, wherein the minimum timing margin in the security element is a timing margin of the register array having a minimum value that satisfies correct signal transfer between two adjacent registers in the register array, wherein the application processor or the interface module becomes abnormal before the security element becomes abnormal under a power supply attack, and wherein the application processor or the interface module becoming abnormal before the security element becomes abnormal under the power supply attack interferes with the power supply attack before sensitive information from the security element is leaked.

2. The chip according to claim 1, wherein the interface module is a bus or a memory controller.

3. The chip according to claim 1, wherein the common pin for powering the security element and at least one of the application processor or the interface module provides a digital power interface.

4. The chip according to claim 1, wherein the common pin for powering the security element and at least one of the application processor or the interface module provides an analog power interface.

5. The chip according to claim 1, wherein the security element comprises a digital power supply port and an analog power supply port, and wherein at least one of the digital power supply port and the analog power supply port is coupled to the common pin.

6. The chip according to claim 5, wherein the chip further comprises a high-speed interface physical layer circuit, a phase-locked loop circuit, and an electrically programmable fuse circuit, and wherein at least one of the high-speed interface physical layer circuit, the phase-locked loop circuit, or the electrically programmable fuse circuit is connected to the analog power supply port.

7. The chip according to claim 1, wherein the security element comprises a coprocessor, a security bus, and a module configured to perform encryption, decryption, and identity authentication.

8. The chip according to claim 1, wherein the security element provides the identity authentication and the information encryption.

9. The chip according to claim 1, wherein a larger timing margin of the register array indicates that the register array has a higher resistance to the power supply attack.

10. The chip according to claim 1, wherein the security element comprises an interaction interface, a secure memory, a digital sensor, and an analog sensor.

\* \* \* \* \*